(12) United States Patent
McRae (10) Patent No.: US 9,736,201 B2
(45) Date of Patent: Aug. 15, 2017

(54) ENCRYPTED STREAMS TO RECEIVERS (71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 285 days.

(21) Appl. No.: 14/561,893

(22) Filed: Dec. 5, 2014

(65) Prior Publication Data

US 2016/0164932 A1    Jun. 9, 2016

(51) Int. Cl.
*G06F 15/173* (2006.01)
*H04L 29/06* (2006.01)

(52) U.S. Cl.
CPC ........ *H04L 65/4069* (2013.01); *H04L 63/101* (2013.01); *H04L 63/108* (2013.01)

(58) Field of Classification Search
CPC .. H04L 65/4069; H04L 63/101; H04L 63/108
USPC ......................................................... 709/231
See application file for complete search history.

(56) References Cited

U.S. PATENT DOCUMENTS

| 8,577,972 | B1 | 11/2013 | Heikes et al. | |
|---|---|---|---|---|
| 2004/0128694 | A1* | 7/2004 | Bantz ................... | H04N 5/4401 725/95 |
| 2008/0095052 | A1* | 4/2008 | Julien ................... | H04L 67/325 370/230 |
| 2009/0285166 | A1* | 11/2009 | Huber ................ | G06Q 20/1235 370/329 |
| 2013/0198521 | A1* | 8/2013 | Wu ..................... | G06F 21/6209 713/175 |
| 2014/0330885 | A1* | 11/2014 | Schulert ................ | H04L 67/142 709/201 |
| 2014/0344894 | A1* | 11/2014 | Moroney ................ | H04L 63/10 726/4 |

FOREIGN PATENT DOCUMENTS

WO    WO2013154532    10/2013

* cited by examiner

*Primary Examiner* — Tauqir Hussain
(74) *Attorney, Agent, or Firm* — Law Office of Scott C Harris, Inc (57) ABSTRACT

A stream receiver device that receives information indicative of streams to be played from remote devices. The stream receiver has a network connection, receiving information indicative of streams to be played from remote devices, e.g., stream senders. A processor in the stream receiver operates to receive the information and operates to play a stream based on the information. The stream receiver has an access list, which can be a white list or a black list. The stream is played when allowed by the white list or not-blocked by the black list. The lists can also include times during which the entries are active, and file types to be allowed or blocked.

22 Claims, 9 Drawing Sheets

|  | WHITE LIST | START | STOP |
|---|---|---|---|
| 72B → | | | |
| 16 → | Engineering Conf 2 | | |
| 28 → | Engineering 1 | 08:00 | 10:00 |
| 30 → | Engineering 2 | 11:00 | 13:00 |
| 32 → | Engineering 3 | 13:00 | 14:00 |
| 34 → | Marketing | 14:00 | 15:00 |
| 36 → | HR | 15:00 | 16:00 |
| 38 → | Finance | 16:00 | 17:00 |
| 60 → | Acceptable Files | | |
| 62 → | .PDF, .DOC, .PPT | | |
| 64 → | .XLS, .TXT | | |

| | BLACK LIST |
|---|---|
| 12 → | |
| 20 → | Admin 1 |
| 28 → | Engineering 1 |
| 30 → | Engineering 2 |
| 32 → | Engineering 3 |
| 42 → | Visitor 1 |
| 44 → | Visitor 2 |
| 46 → | Visitor 3 |
| 48 → | Visitor 4 |

| BLACK LIST | START | STOP |
|---|---|---|
| Admin 1 | | |
| Visitor 1 | 08:00 | 10:00 |
| Visitor 2 | 10:00 | 12:00 |
| Visitor 3 | 13:00 | 15:00 |
| Visitor 4 | 15:00 | 17:00 |
| Blocked Files | | |
| .ASF, .WMA, WM | | |
| .MOV | | |

54D
72B → (BLACK LIST)
16 → Admin 1
42 → Visitor 1
44 → Visitor 2
46 → Visitor 3
48 → Visitor 4
66 → Blocked Files
68 → .ASF, .WMA, WM
70 → .MOV

Figure 3C 56C
72B → BLACK LIST
24 → Open Conf
28 → Engineering 1
30 → Engineering 2
32 → Engineering 3
34 → Marketing 1
36 → HR 1
38 → Finance 1

ENCRYPTED STREAMS TO RECEIVERS

BACKGROUND

Content casting applications (senders) can send or cast content streams or static content to multiple stream receivers. This allows a person in their home environment to cast content streams and static content to any stream receiver reachable through their home network.

While this may be desirable in a home environment, it can be very undesirable and unsafe in an office environment. In the office environment, stream receivers may be specific to certain functional areas of the business. For example, stream receivers in an engineering department should not receive casted content streams or static content from say Marketing, Finance, or HR departments. Stream receivers located in open conference rooms where outside persons meet with company personal should not be able to see sensitive content from finance, legal, HR, or internal engineering.

However, it can still be desirable to use stream receivers in conference rooms like this to obtain such information, when it is in fact authorized.

SUMMARY

The present invention allows for the use of white and black lists as part of content casting applications.

An embodiment uses a white list residing on a stream receiver to identify if a content casting application has access rights any time or only during pre-specified times to the stream receiver. A black list residing on a stream receiver identifies content casting applications that never have access rights or are prevented from having access rights only during pre-specified times to the stream cast receiver.

BRIEF DESCRIPTION OF THE DRAWINGS in the drawings.

DETAILED DESCRIPTION

Embodiments include the following functions in a stream sender; stream receiver, and/or in a combination of stream sender/stream receiver.

A device is described with a processor that is programmed with the ability to create a white list and/or black list of content casting application devices that may (or may not) have access to the given stream receiver. The lists may be absolute, that is the white list may allow total access at all times; or the lists may be timed, to allow or prevent access only at specified times. This allows the owner of the stream receiver, for example to limit the allowed clients that have access to the receiver. The receiver can be identified by MACID, name, user ID, device type, and other criteria.

Figure 3A:
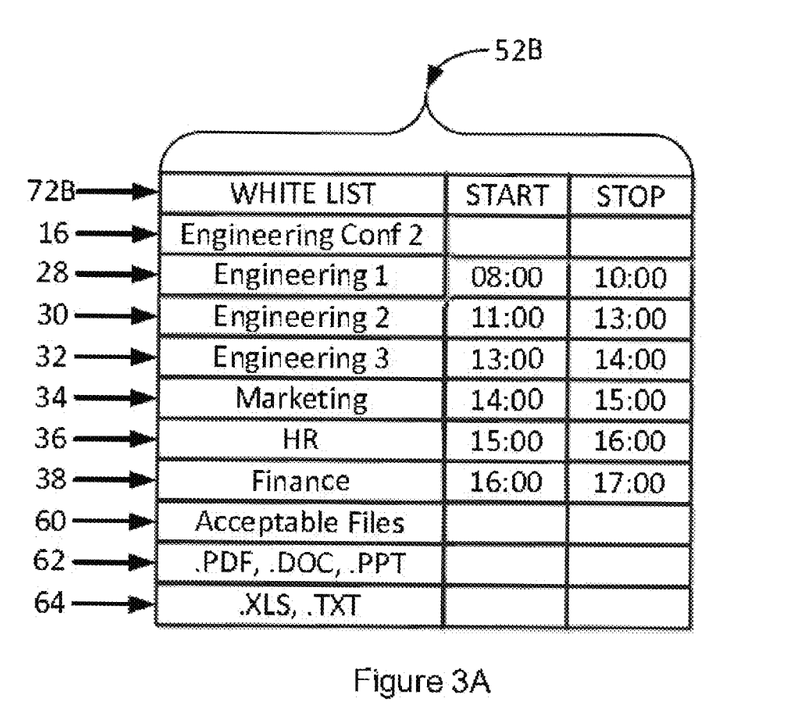
FIG. 3A depicts a WHITE LIST table with scheduling data maintained by stream receiver 16.

A use for this, for example, would be in a conference room environment where the conference room is reserved at different times by different people or entities. The reservation can include, for example, the ability to include a white list entry such as shown in FIG. 3A, during the time that the entity has reserved the room. For example, engineering 1 has reserved the room in FIG. 3A from 8 am to 10 am, and the reservation can either automatically or manually include a white list entry allowing a stream receive from engineering 1 during the time that the room is being used for that purpose.

In a preferred embodiment, a WHITE LIST residing on a stream receiver contains a list of content casting applications that have access to the stream receiver.

In a related embodiment, the WHITE LIST contained on a stream casting receiver may also have a schedule which identifies by date, time, or by date and time the periods when any of the content casting applications listed in the WHITE LIST may have access to the stream receiver.

In another related embodiment, the WHITE LIST contained on a stream cast receiver may also contain the types of content that may be displayed on the stream receiver.

In another preferred embodiment, a black list on a stream receiver contains a list of content casting applications that are specifically prohibited from ever having access to the given stream receiver.

In a related embodiment, the black list contained on a stream receiver may also have a schedule which identifies by date, time, or by date and time the periods when any of the stream cast agents listed in the black list may have access to the stream cast receiver.

In a related embodiment, the BLACK LIST contained on a stream receiver may also contain the types of content that may not be displayed on the stream receiver.

DETAILED DESCRIPTION OF THE EMBODIMENTS

Figure 1:
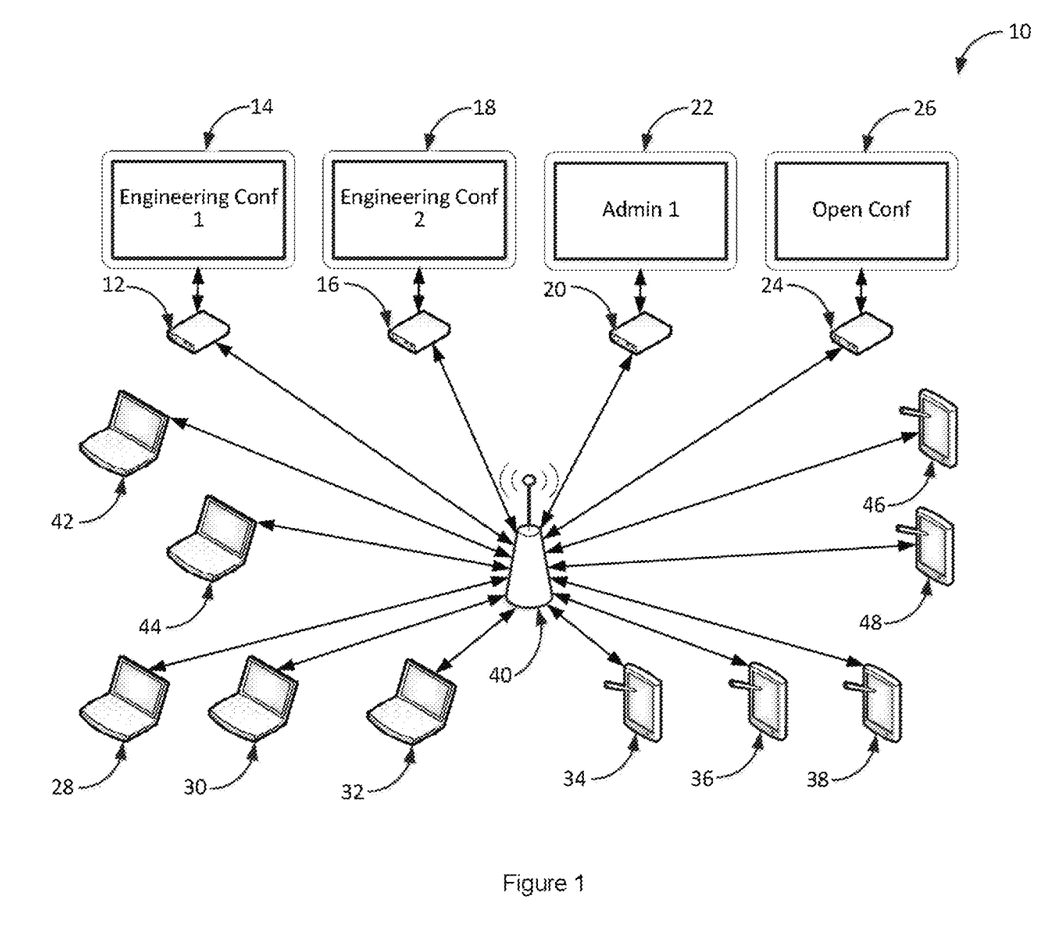
FIG. 1 depicts a distributed environment with multiple computers and receivers.

Now referencing FIG. 1 where 10 depicts a distributed environment that contains computing devices 28 through 48 that support casting agents. These computing devices are grouped according to departments or organizations. An engineering department has 3 laptop computers here, (engineering 1-28, engineering 2-30, and engineering 3-32), and admin has three tablet computer (marketing 1-34, HR 1-36, and Finance 1-38). In FIG. 1, there are 4 possible visitor computers (visitor 1-42, visitor 2-44, visitor 3-46, and visitor 4-48). There are four stream receivers capable of receiving cast streams (engineering conf 1-12, engineering conf 2-16, admin 1-22, and open conf (24).

An Engineering organization has three laptop computers with casting agents with the IDs of Engineering 1 (28), Engineering 2 (30), and Engineering 3 (32). These computing devices have access to two stream receiver devices with attached display screens with the IDs of Engineering Conf 1 (12/14) and Engineering Conf 2 (16/18).

There are three tablet computers with casting agents with the IDs of Marketing (34), HR (36), and Finance (38). These computing devices have access to one stream receiving device with an attached display screen with the ID of Admin 1 (20/22).

For the purpose of this description, there are two laptop computing devices and two tablet computing devices for visitors with the IDs of Visitor 1 (42), Visitor 2 (44), Visitor 3 (46), and Visitor 4 (48). These computing devices have access to one stream receiving device with an attached display screen with the ID of Open Conf (24/26).

In one embodiment, just entering the department name, e.g., "engineering" or "admin1" automatically associates the computers that are associated with that department and puts those computers on the black (or white) list.

All of the stream casting computing devices and stream receiver computing devices communicate through a wireless link provided by Wifi Access Point 40. The devices can also communicate via other network protocols, such as a wired protocol or cellular for example.

Each of the stream receivers may have numbered tables as shown in the following table:

TABLE 1

| | WHITE LIST | WHITE LIST Scheduling | Black List | Black List Scheduling |
|---|---|---|---|---|
| Engineering 1 | 50A | 52B | | |
| Engineering 2 | 52A | 52B | | |
| Admin 1 | 54A | 54B | 54C | 54D |
| Open Conf | 56A | | 56C | |

Note, for the purposes of clarity and brevity of descriptions, not all of the possible tables have a matching table description. Each type of table however is represented in the detailed description of this specification.

The concept of a WHITE LIST and a BLACK LIST in data communications and access control systems is well known in the art but the inventors believe that the use of, and more specifically how such lists in the present invention are used are new, novel, and not obvious.

Figure 2A:
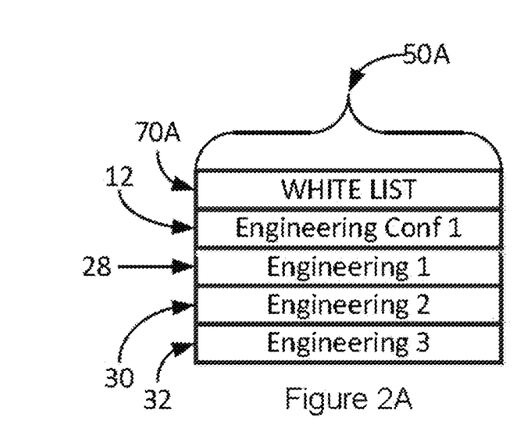
FIG. 2A depicts a WHITE LIST table maintained by stream receiver 12.

Now referencing FIG. 2A where 50A represents a WHITE LIST maintained by stream receiver device 12 with attached display device 14 (Engineering Conf 1). This table contains an identifier 50A WHITE LIST and an organization identifier of 12 (ID of the stream receiver), and the IDs of three computing devices with casting agents that have authorized access to stream receiver 12. The authorized devices in this WHITE LIST are 28 Engineering 1, 30 Engineering 2, and 32 Engineering 3. Any device not listed in WHITE LIST 50A attempting to access stream receiver 12 will be rejected by stream receiver 12.

Figures 2B, 2D:
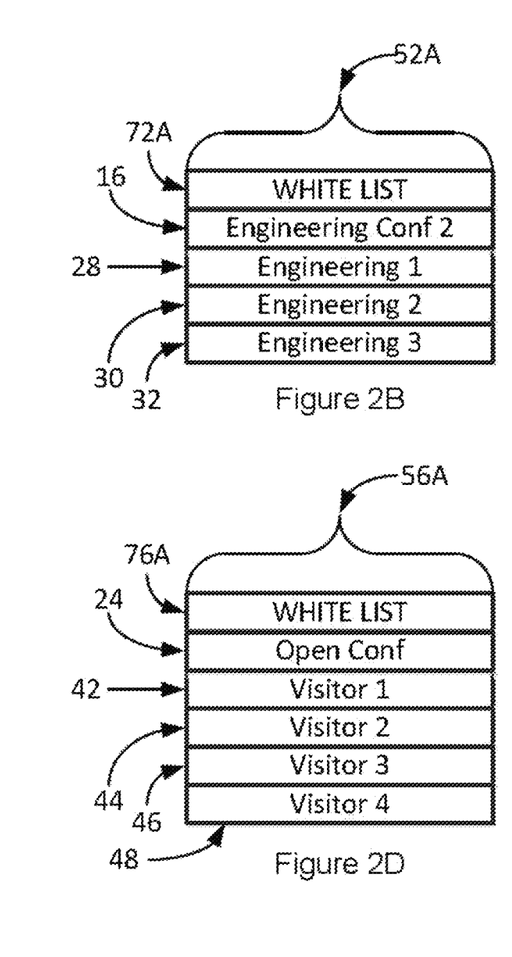
FIG. 2B depicts a WHITE LIST table maintained by stream receiver 16.
FIG. 2D depicts a WHITE LIST table maintained by stream receiver 24.

Now referencing FIG. 2B where 52A represents a WHITE LIST maintained by stream receiver device 16 with attached display device 18 (Engineering Conf 2). This table contains an identifier 72A WHITE LIST and an organization identifier of 16 (ID of the stream receiver), and the IDs of three computing devices with casting agents that have authorized access to stream receiver 12. The authorized devices in this WHITE LIST are 28 Engineering 1, 30 Engineering 2, and 32 Engineering 3. Any device not listed in WHITE LIST 52A attempting to access stream receiver 12 will be rejected by stream receiver 12.

Figure 2C:
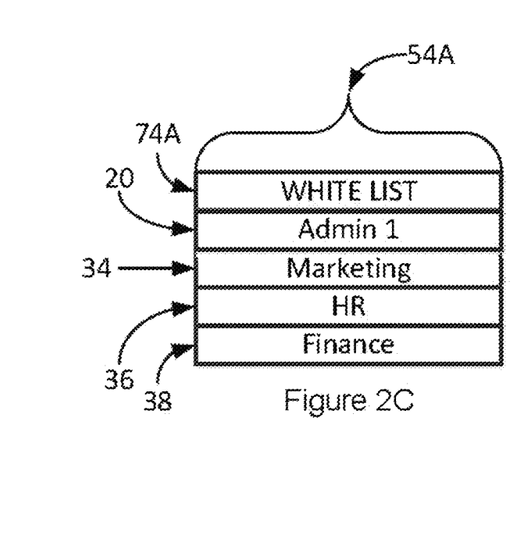
FIG. 2C depicts a WHITE LIST table maintained by stream receiver 20.

Now referencing FIG. 2C where 54A represents a WHITE LIST maintained by stream receiver device 20 with attached display device 22 (Admin 1). This table contains an identifier 74A WHITE LIST and an organization identifier of 20 (ID of the stream receiver), and the IDs of three computing devices with casting agents that have authorized access to stream receiver 20. The authorized devices in this WHITE LIST are 34 Marketing, 36 HR, and 38 Finance. Any device not listed in WHITE LIST 54A attempting to access stream receiver 20 will be rejected by stream receiver 20.

Now referencing FIG. 2D where 56A represents a WHITE LIST maintained by stream receiver device 24 with attached display device 26 (Open Conf). This table contains an identifier 76A WHITE LIST and an organization identifier of 24 (ID of the stream receiver), and the IDs of four computing devices with casting agents that have authorized access to stream receiver 24. The authorized devices in this WHITE LIST are 42 Visitor 1, 44 Visitor 2, and 46 Visitor 3, and 48 Visitor 4. Any device not listed in WHITE LIST 76A attempting to access stream receiver 24 will be rejected by stream receiver 24.

Now referencing FIG. 3A where 52B represents a WHITE LIST with scheduling data for stream receiver device 16 Engineering Conf 2. In this representation, each of the three engineering computing devices with a stream casting agent have assigned access periods during the day. For example, computing device 28 Engineering 1, has access to stream receiver 16 from 8:00 am to 10:00 am each day. The uniqueness of the WHITE LIST represented by 52B is that computing devices outside of the engineering organization may also have access to stream receiver 16, engineering conf 2. Note that computing device 34 Marketing, has access to stream receiver 16, engineering conf 2 each day from 14:00 to 15:00.

FIG. 3A also shows that white list 52B for 16 Engineering Conf 2 also contains file type restrictions. Acceptable Files section 60 of white list 52B, contains a list of files that may be received by Stream Receiver 16 and displayed. Entry 62 and entry 64 of white list 52B contains a list of acceptable files which are depicted as Microsoft® file types: ".DOC" (word files), ".PPT" (Power Point® files), ".XLS" (EXCEL® files), and ".TXT" (generic text files), and one Adobe® file type of ".PDF" (portable document format). If any other file type is sent to Stream Receiver 16 it is rejected.

Figure 3B:
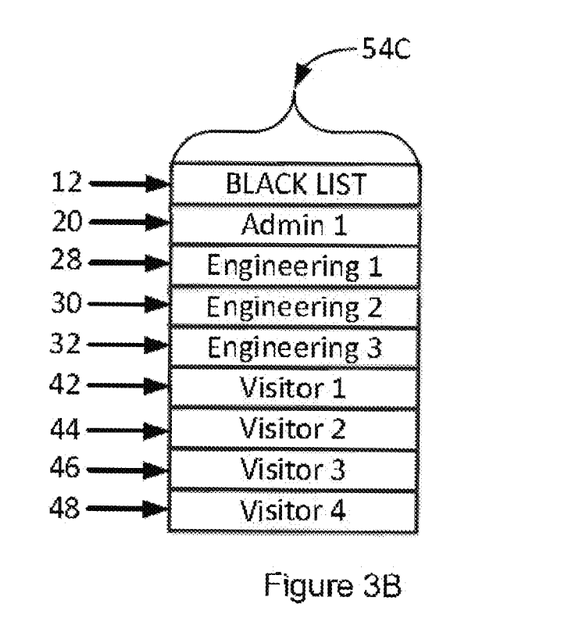
FIG. 3B depicts a black list table maintained by stream receiver 20.

Now referencing FIG. 3B where 54C represents a black list that specifically excludes stream casting devices from stream receiver 20 Admin 1. In this representation, all three computing devices with stream casting agents assigned to engineering are specifically excluded from gaining access to stream receiver device 20. If stream receiver 20 were to only have a black list to control access, any device containing a stream casting agent, other than those on the black list, would be able to gain access.

Figure 3C:
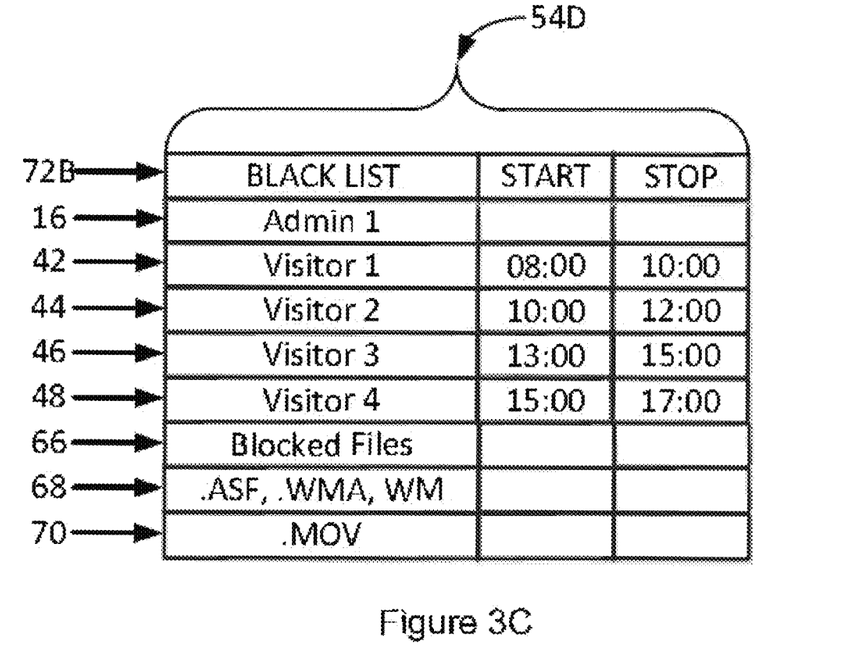
FIG. 3C depicts a black list table with scheduling data maintained by stream receiver 20.

Now referencing FIG. 3C where 54D represents a black list with scheduling data for stream receiver 20 with attached display device 22 (Admin 1). This black list device contains access rights for computing devices 42 Visitor 1, 44 Visitor 2, 46 Visitor 3, and 48 Visitor 4 which are normally restricted to Open Conf stream receiver 24/26 . . . If Open Conf 1 becomes over committed, Visitors 1-4 can be entered into Black List table 54D for Admin 1 16 so that they, Visitors 1-4, have access for presentations. Each of the Visitor computing devices has allocated start and stop times as shown in Black List 54D.

FIG. 3C also shows that Black List 54D for 20 Admin 1 also contains file type restrictions. Blocked Files section 66 of Black List 54D, contains a list of files that may not be received by Stream Receiver 20 and displayed. Entry 68 and entry 70 of Black List 54D contains a list of non-acceptable files which are depicted as Microsoft® multimedia file types: ".ASF" (Advanced Systems Format), ".WMA" (Windows Media® Audio files), ".WM" (Windows Media® A/V files), and ".MOV" (Apple® Quicktime® files).

Figure 3D:
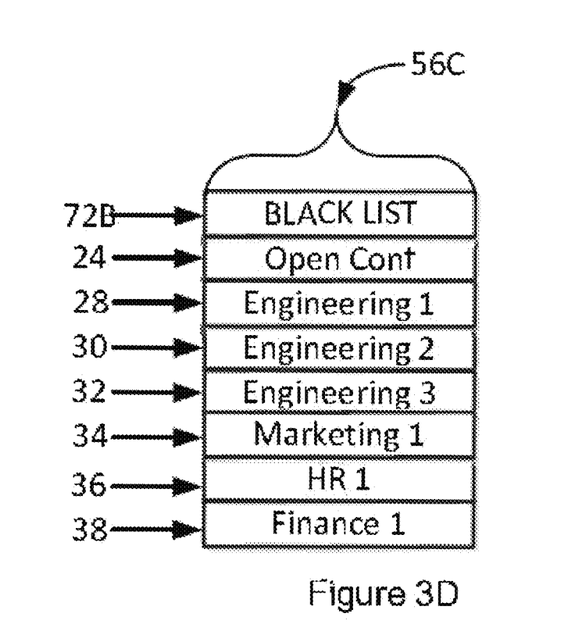
FIG. 3D depicts a black list maintained by stream receiver 24.

Now referencing FIG. 3D where 56C represents a Black List for stream receiver 24 with attached display device 26 Open Conf. This BLACK LIST excludes any stream casting device not normally assigned to stream receiver 24 Open Conf. In this case, stream receiver 24 is intended for the open conference room where visitors make use of the stream casting for presentations. In this instance, outside representatives may be present and no sensitive content from inside the company should be displayed. Therefore, 28 Engineering 1, 30 Engineering 2, 32 Engineering 3, 34 Marketing 1, 36 HR 1, and 38 Finance 1 are all excluded from casting content to 24 Open Conf. There may also be cases where open conference rooms, such as Open Conf 24, may have network access outside of a corporate firewall to prevent vendors from having access to the corporate network. Black List 56C, in this embodiment, prevents corporate computing devices from attaching to a network outside of the corporate firewall.

Figure 4:
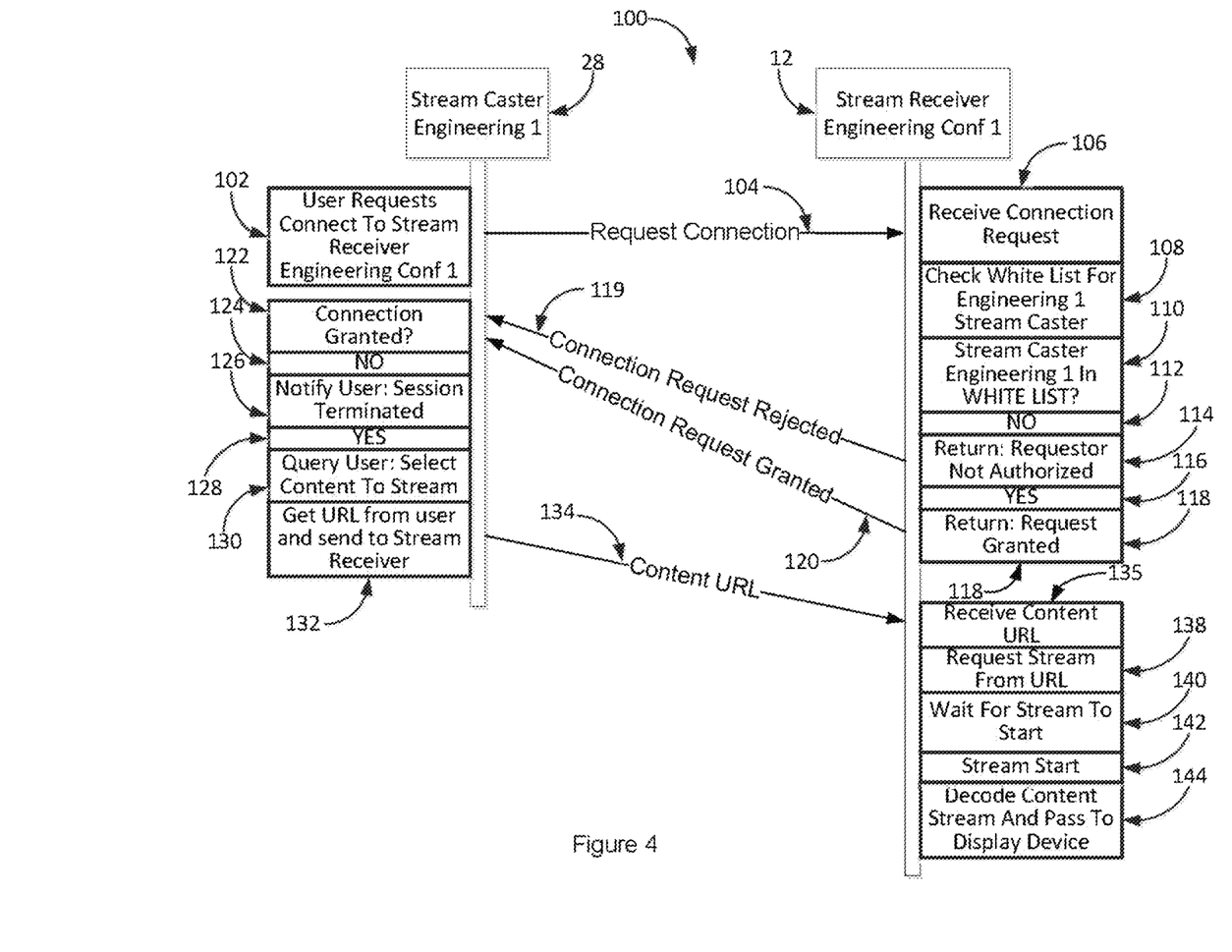
FIG. 4 is a schematic logic flow for the case where a computing device with a stream casting agent attempts to connect to a computing device with a stream receiver where the computing device with the stream casting agent is listed in the WHITE LIST for the targeted stream receiver.

Now referencing FIG. 4 where a logic flow schematic depicts the case where a stream caster 28 (Engineering 1) successfully connects to stream receiver 12 (Engineering Conference Room 1). This depiction begins with Stream Caster 28 at processing block 102 user requests connect to stream receiver engineering conf 1. This processing block sends signal 104 request connection to processing block 106 receive connection request. This processing block waits for connect requests from stream casting agents and when a connection request is received, control falls through to process block 108 check WHITE LIST for engineering 1 stream caster.

This processing block, in this depiction, accesses WHITE LIST 50A to see if engineering 1-28 is listed after which control falls through to processing block 110 stream caster engineering 1 in WHITE LIST? This processing block searches WHITE LIST 50A and if a match is not made, control falls through to results processing block 112 which transfers control to return processing block 113 return: requestor not authorized, which returns a status to decision processing block 122 which is signal 119 connected request rejected.

In this depiction, processing block 112 found a match after which control will be transferred to results processing block 116 YES after which control is transferred to return processing block 118 return: request granted. This processing block sends signal 120 connected request granted to decision process block 122 connection granted? which transfers control to results processing block 128 YES after which control falls through to query user processing block 130 query user: select content to stream after which control falls through to send processing block 132 get URL from user and send to stream receiver. This processing block sends signal 134 content URL to receive processing block 135 receive content URL.

This processing block waits to receive URLs from stream casting agents and after receiving a URL, control falls through to request processing block 138 request stream from URL. This processing block makes a request to the specified URL for the stream contained in the URL descriptor after which control falls through to wait processing block 140 to wait for stream to start. Once the stream is detected to have started, control falls through to processing block 142 after which control falls through to decode processing block 144 decode content stream and pass to display device.

Figure 5:
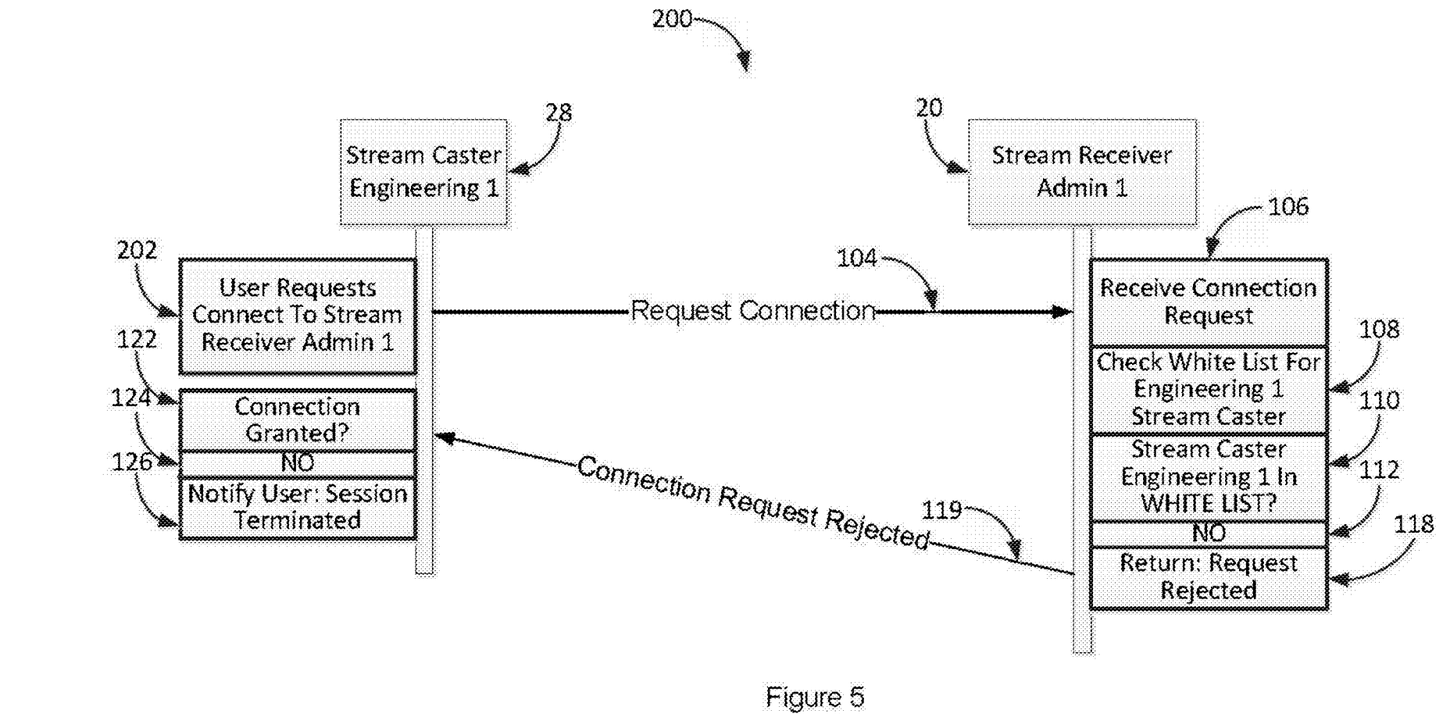
FIG. 5 is a schematic logic flow for the case where a computing device with a stream casting agent attempts to connect to a computing device with a stream receiver where the computing device with the stream casting agent is not listed in the WHITE LIST for the targeted stream receiver.

Now referencing FIG. 5 where a logic flow schematic depicts the case where stream caster 28 (Engineering 1) successfully connects to stream receiver 20 (Admin 1). This depiction begins with Stream Caster 28 at processing block 202 user requests connect to stream receiver admin 1 20. This processing block sends signal 104 request connection to processing block 106 receive connection request. This processing block waits for connect requests from stream casting agents and when a connection request is received, control falls through to process block 108 check WHITE LIST for engineering 1 stream caster. This processing block, in this depiction, accesses WHITE LIST 54A to see if engineering 1-28 is listed after which control falls through to processing block 110 stream caster engineering 1 in WHITE LIST? This processing block searches WHITE LIST 54A and if a match is not made, control will fall through to results processing block 112 which will transfer control to return processing block 118 return: request rejected which will return a status to decision processing block 122 which will be signal 116 connected request rejected.

Decision processing block 122 receives signal 119 connection request rejected after which control falls through to results processing block 124 NO after which control will be transferred to notify user processing block 126 notify user: session terminated.

Figure 6:
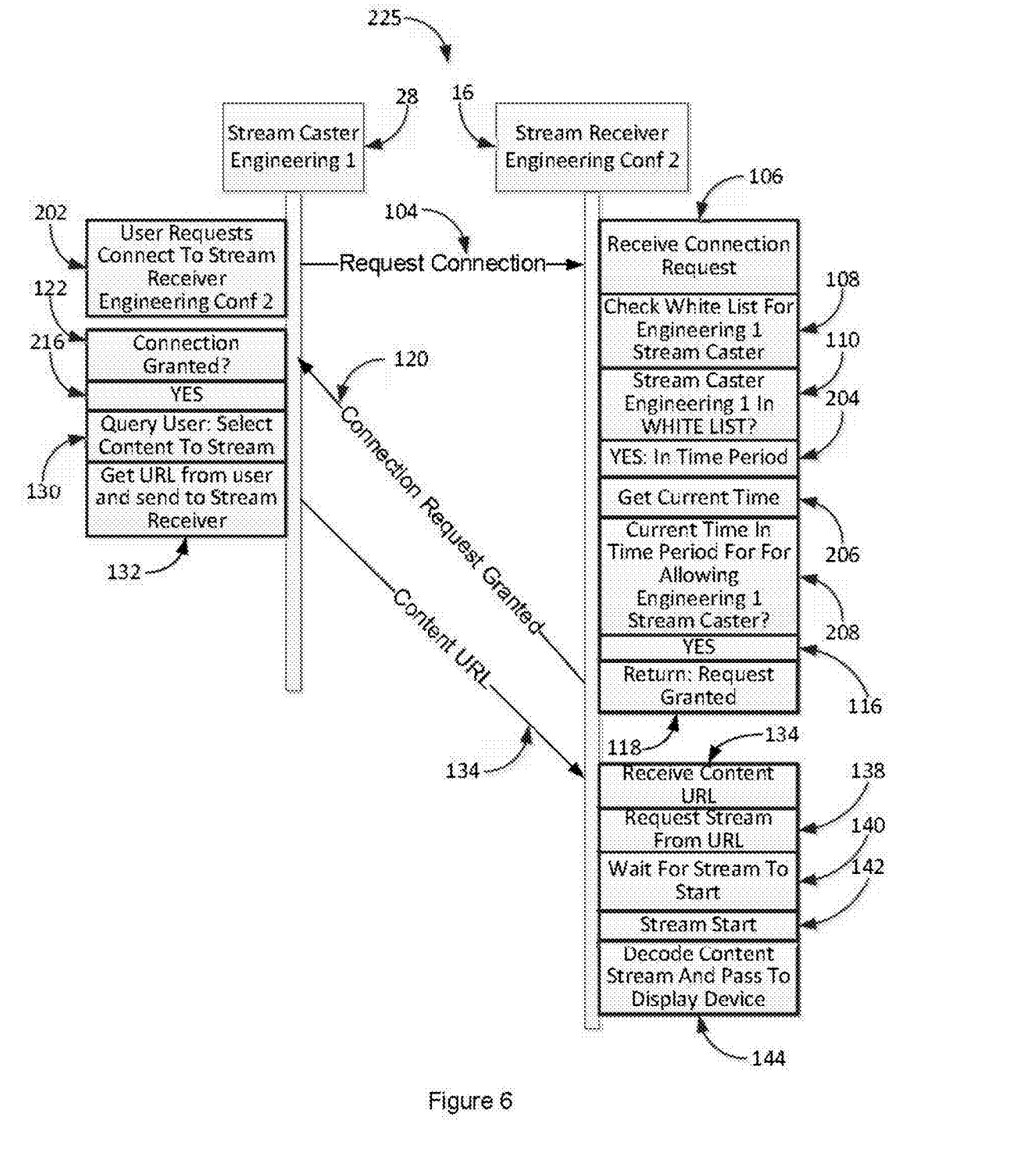
FIG. 6 is a schematic logic flow for the case where a computing device with a stream casting agent attempts to connect to a computing device with a stream receiver where the computing device with the stream casting agent is listed in the WHITE LIST for the targeted stream receiver but the stream casting device are restricted to access based on time of day periods.

Now referencing FIG. 6 where a logic flow schematic depicts the case where a stream caster 28 (Engineering 1) successfully connects to stream receiver 16 (Engineering Conference Room 2). This depiction begins with Stream Caster 28 at processing block 202 user requests connect to stream receiver engineering conf 2. This processing block sends signal 104 request connection to processing block 106 receive connection request. This processing block waits for connect requests from stream casting agents and when a connection request is received, control falls through to process block 108 check WHITE LIST for engineering 1 stream caster.

This processing block, in this depiction, accesses WHITE LIST 52A to see if engineering 1-28 is listed, after which control falls through to decision processing block 204 YES: in time period? after which control will fall through to processing block 206 get current time after which control will fall through to decision processing block 208 current time in time period for allowing engineering 1 stream caster? This decision processing block will verify that stream casting engineering 1 28 is in a block of time at the current time.

Reference FIG. 3A for a depiction of this WHITE LIST. Note that engineering 1-28 stream casting agent is authorized for access to stream receiver 16 starting at 08:00 and ending at 10:00. If the current time is between 08:00 and 10:00 control will fall through to results processing block 116 after which control will be transferred to return processing block 118 return: request granted. For the purpose of clarity and brevity, the case where 28 engineering 1 stream caster is not in white list 52B or is outside of the boundaries of its time period are not depicted.

Return processing block 118 sends signal 120 connection request granted to decision processing block 122 connection granted? which will transfer control to results processing block 216 YES after which control will fall through to query user processing block 130 query user: select content to stream after which control will fall through to send processing block 132 get URL from user and send to stream receiver. This processing block will send signal 134 content URL to receive processing block 135 receive content URL.

This processing block waits to receive URLs from stream casting agents and after receiving a URL control will fall through to request processing block 138 request stream from URL. This processing block will make a request to the specified URL for the stream contained in the URL descriptor after which control will fall through to wait processing block 140 wait for stream to start. Once the stream is detected to have started, control will fall through to processing block 142 after which control falls through to decode processing block 144 decode content stream and pass to display device.

Figure 7:
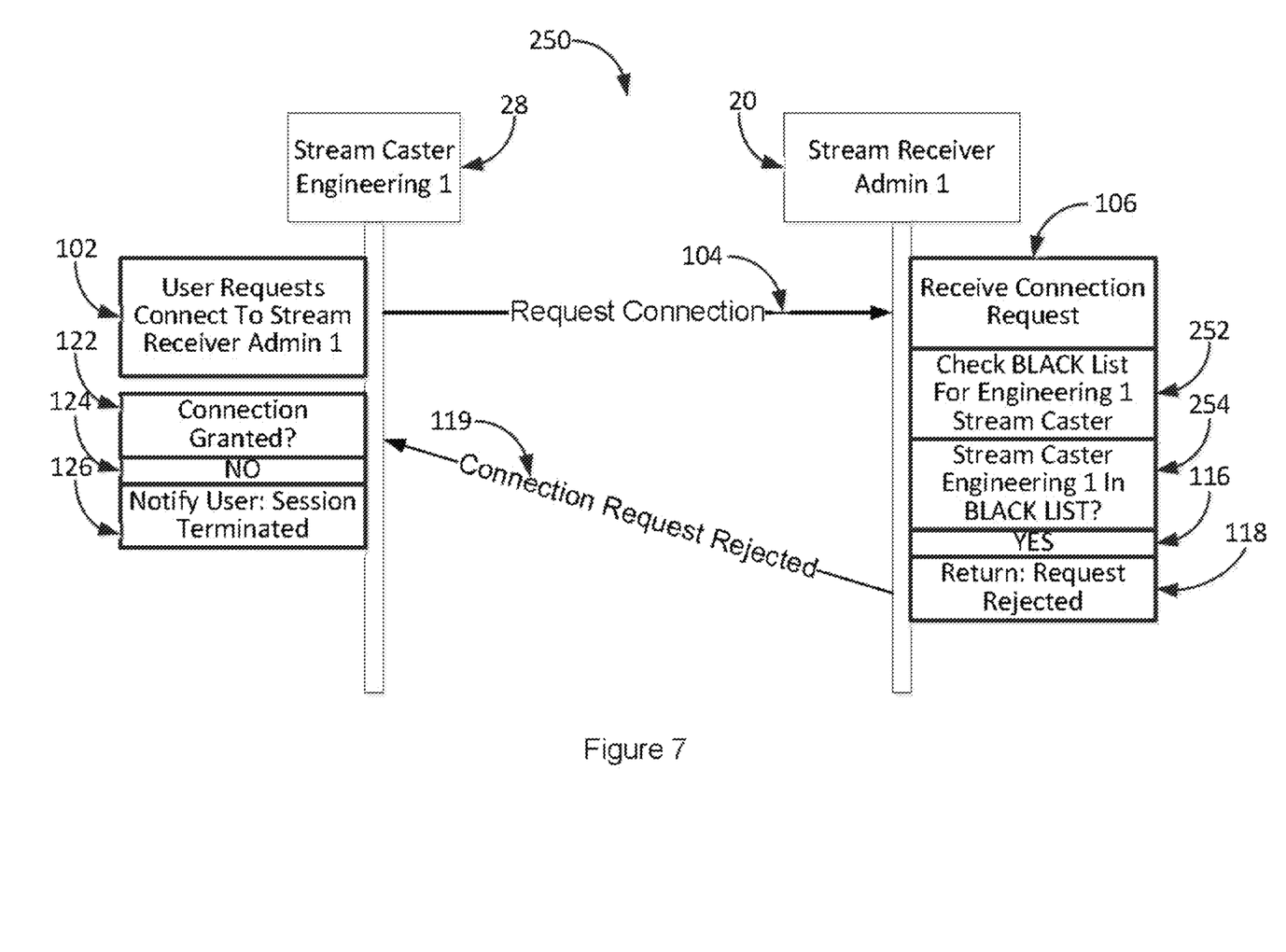
FIG. 7 is a schematic logic flow for the case where a computing device with a stream casting agent attempts to connect to a computing device with a stream receiver where the computing device with the stream casting agent is listed in a black list for the targeted stream receiver which denies access.

Now referencing FIG. 7 where a logic flow schematic depicts the case where a stream caster 28 (Engineering 1) successfully connects to stream receiver 20 (Admin 1). This depiction begins with Stream Caster 28 at processing block 102 user requests connect to stream receiver admin 1 20. This processing block sends signal 104 request connection to processing block 106 receive connection request. This processing block waits for connect requests from stream casting agents and when a connection request is received, control falls through to process block 252 check BLACK LIST for engineering 1 stream caster.

This processing block, in this depiction, accesses BLACK LIST 54C to see if engineering 1-28 is listed after which control falls through to processing block 254 stream caster engineering 1 in BLACK LIST? This processing block searches BLACK LIST 54C and if a match is made, control will fall through to results processing block 116 YES which will transfer control to return processing block 118 return: request rejected which will return a status to decision processing block 122 which will be signal 119 connected request rejected.

Decision processing block 122 receives signal 119 connection request rejected after which control will fall through to results processing block 124 NO after which control will be transferred to notify user processing block 126 notify user: session terminated.

Figure 8:
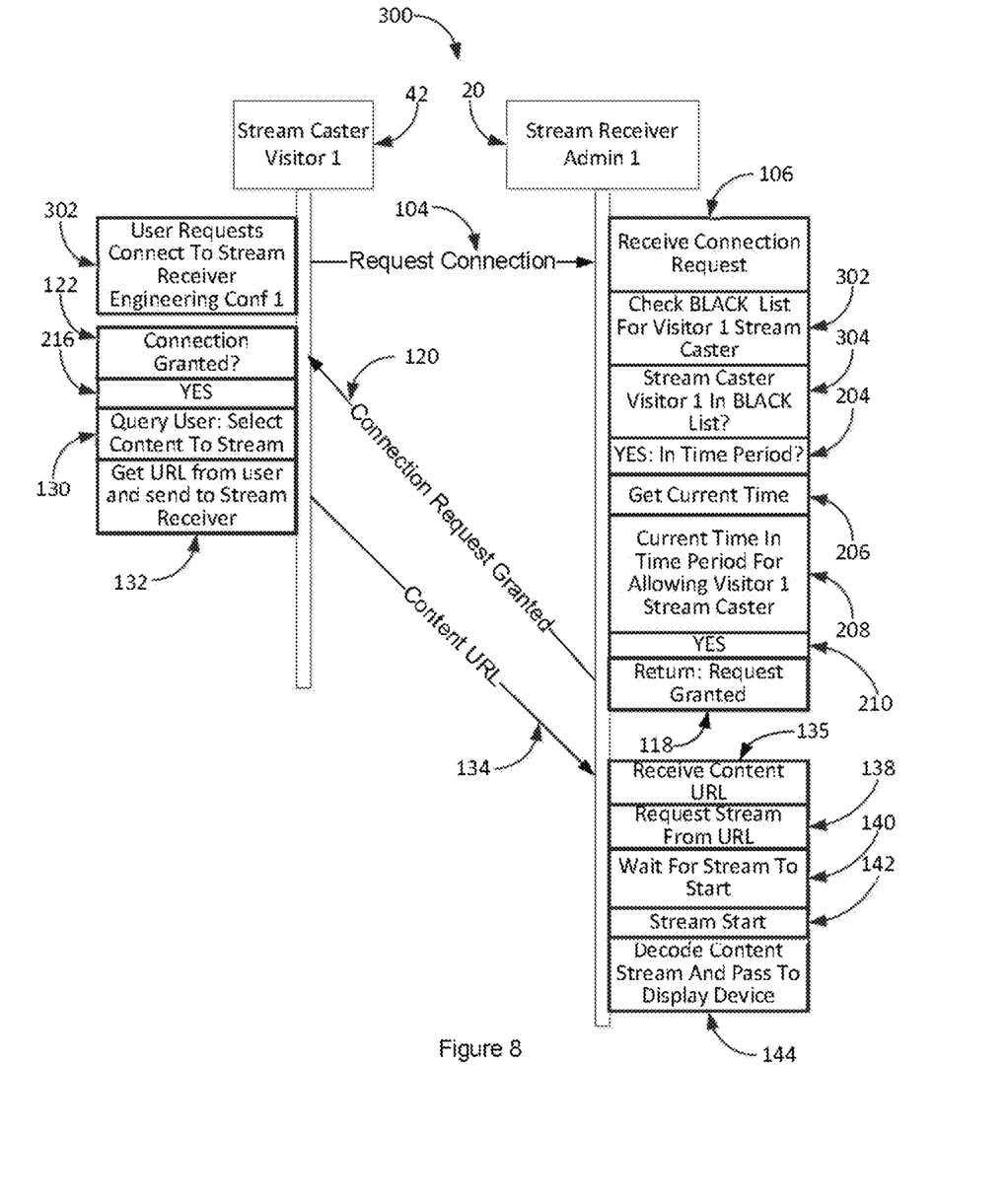
FIG. 8 is a schematic logic flow for the case where a computing device with a stream casting agent attempts to connect to a computing device with a stream receiver where the computing device with the stream casting agent is listed in the black list for the targeted stream receiver where the stream casting devices are restricted to access based on time of day periods.

Now referencing FIG. 8 where a logic flow schematic depicts the case where a stream caster 42 (Visitor 1) successfully connects to stream receiver 20 (Admin 1). This depiction begins with Stream Caster 42 at processing block 302 user requests connect to stream receiver 20 admin 1. This processing block sends signal 104 request connection to processing block 106 receive connection request. This processing block waist for connect requests from stream casting agents and when a connection request is received, control falls through to process block 302 check BLACK LIST for visitor 1 stream caster.

This processing block, in this depiction, accesses BLACK LIST 54D to see if visitor 1-42 is listed after which control falls through to decision processing block 304 YES: in time period? after which control falls through to processing block 206 get current time after which control falls through to decision processing block 208 current time in time period for allowing visitor 1 stream caster? This decision processing block verifies that stream casting visitor 1 42 is in a block of time at the current time. Reference FIG. 3C for a depiction of this BLACK LIST. Note that visitor 1-42 stream casting agent is authorized for access to stream receiver 16 starting at 08:00 and ending at 10:00. If the current time is between 08:00 and 10:00 control will fall through to results processing block 210 after which control will be transferred to return processing block 118 return: request granted. For the purpose of clarity and brevity, the case where 42 visitor 1 stream caster is not in BLACK LIST 54D or is outside of the boundaries of its time period are not depicted.

Return processing block 118 sends signal 120 connection request granted to decision processing block 122 connection granted? which will transfer control to results processing block 216 YES after which control will falls through to query user processing block 130 query user: select content to stream after which control will fall through to send processing block 132 get URL from user and send to stream receiver. This processing block will send signal 134 content URL to receive processing block 135 receive content URL.

This processing block waits to receive URLs from stream casting agents and after receiving a URL control will fall through to request processing block 138 request stream from URL. This processing block will make a request to the specified URL for the stream contained in the URL descriptor after which control will fall through to wait processing block 140 wait for stream to start. Once the stream is detected to have started, control will fall through to processing block 142 after which control will fall through to decode processing block 144 decode content stream and pass to display device.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of computers.

Note also that the above has described operation with a digital sender. However, more generally, this can be used on any kind of device that displays videos, such as television sets, Set top boxes, Game consoles, Tuner dongles, Personal computers, and any other device having the ability to display AV content. Other kinds of content receivers and content servers are also contemplated, it being understood that each of these can be carried out by a computer that has a processor that executes stored instructions of any known type.

Also, the system can be used with both white and black lists. This can use a system where senders that are not on white list are blocked; and senders on the black list are blocked, so that both are blocked. Alternatively, priorities can be set; for example, anything on the white list is allowed, even if it's also on the black list. Alternately, the priority can be set that anything on the black list is blocked even if it is also on the white list.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other. The remote devices, for example, can be at least one of a desktop or laptop computer, tablet computer, a cellular phone, a PDA, or a gaming console.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A stream receiver device that receives information indicative of streams to be played from remote devices, said stream receiver device comprising:
    a network connection, receiving information indicative of streams to be played from remote devices; and
    a processor, that operates to receive the information and operates to play a stream based on said information,
    said stream receiver including an access list of remote devices where the list has multiple entries, and also includes a time period associated with multiple entries, each time period indicating times during which an entry is active and outside of which the entry is not active, and said processor comparing a first sender that sent the information to the entries in the list and comparing a current time to a time period during which the entries are active, and the stream receiver operating for playing the stream when the first sender is indicated by the list to be a sender that is allowed to play at the current time based on the entries and based on the comparing and not playing the stream when the first sender is indicated by the list to be a sender that is not allowed to play at the current time, based on both the entries and based on the comparing;
    wherein said processor operates to not play information from the first sender if content from the first sender does not matches to said information about file types on said white list.

2. The stream receiver as in claim 1, wherein said list is a white list, and said comparing allows the first sender to play when information indicative of the first sender is on the white list and the current time matches to a time period associated with the entry for the first sender being on the white list, and not allowing the first sender to play when information indicative of the first sender is not on the white list and not allowing the first sender to play when information indicative of the first sender is on the white list but the time period associated with the first sender being on the white list does not match to the current time.

3. The stream receiver as in claim 1, wherein said list is a blacklist, and said comparing allows the first sender to play if information indicative of the first sender is not on the blacklist and allowing the first sender to play when information indicative of the entry for the first sender being on the black list but the time period associated with the first sender being on the black list does not match to the current time, and not allowing the first sender to play if information indicative of the first sender is on the blacklist and the time period associated with the first sender being on the black list matches to the current time.

4. The stream receiver as in claim 1, wherein the processor also includes information about file types, and said processor operates to only use items on the list if a file type of a stream matches to the list.

5. The stream receiver as in claim 4, wherein the information about file type includes a file extension.

6. The stream receiver as in claim 2, wherein the processor also includes information about file types, and only allows the allowed file types to be played.

7. The stream receiver as in claim 3, wherein the list also includes information about prohibited file types, and will not allow playing the prohibited file types.

8. The stream receiver as in claim 1, wherein said information indicative of the stream is a URL at which the stream is stored.

9. The stream receiver as in claim 1, wherein said list includes a department name that includes multiple computers therein.

10. The stream receiver as in claim 1, wherein said list includes unique identifying information indicative of a computer.

11. The stream receiver as in claim 1, wherein said remote device is at least one of a desktop or laptop computer, tablet computer, a cellular phone, a PDA, a gaming console.

12. A method of operating a stream receiver device, comprising;
    a network connection, receiving information indicative of streams to be played from remote devices; and
    a processor, that operates to receive the information and operates to play a stream based on said information,
    receiving information indicative of a stream to be played from a remote device;
    storing an access list of remote devices, where the list has multiple entries, and also includes a time period associated with multiple entries, each time period indicating times during which an entry is active and outside of which the entry is not active;
    comparing a first sender from which the information was received, to the entries in the access list, and comparing a current time to a time period during which the entries are active and playing the stream when the first sender is indicated by the list to be a sender that is allowed to play at the current time based on the entries and based on the comparing and not playing the stream when the first sender is indicated by the list to be a sender that is not allowed to play at the current time, based on both the entries and based on the comparing;

wherein said processor operates to not play information from the first sender if content from the first sender matches to said information about file types on said black list.

13. The method as in claim 12, wherein said list is a white list, and said comparing allows the first sender to play only when information indicative of the first sender is on the white list and the current time matches to a time period associated with an entry for the first sender being on the white list, and not allowing the first sender to play when information indicative of the first sender is not on the white list, and not allowing the first sender to play when information indicative of the first sender is on the white list but the time period associated with the first sender being on the white list does not match to the current time.

14. The method as in claim 12, wherein said list is a blacklist, and said comparing allows the first sender to play if information indicative of the first sender is not on the blacklist and allowing the first sender to play when information indicative of the first sender is on the blacklist but the time period associated with an entry for the first sender being on the blacklist does not match to the current time, and not allowing the first sender to play if information indicative of the first sender is on the blacklist and the time period associated with the first sender being on the black list matches to the current time.

15. The method as in claim 12, wherein the list also includes information about file types, and further comprising playing the stream when the file types is indicated by the list to be a file types that is allowed to play and not playing the stream when the file types is indicated by the list to be a file type that is not allowed to play.

16. The method as in claim 15, wherein the information about file types is a file extension.

17. The method as in claim 13, wherein the list also includes information about file types, and only allowing the allowed filed types to be played.

18. The method as in claim 14, wherein the list also includes information about prohibited file types, and does not allow playing the prohibited file types.

19. The method as in claim 12, wherein said information indicative of the stream is a URL at which the stream is stored.

20. The method as in claim 12, wherein said list includes a department name that includes multiple computers therein.

21. A stream receiver device that receives information indicative of streams to be played from remote devices, said stream receiver device comprising:
a network connection, receiving information indicative of streams to be played from remote devices; and
a processor, that operates to receive the information and operates to play a stream based on said information,
said stream receiver including an access list of remote devices, said access list being a white list, that includes multiple entries, including devices that are allowed to pay, and and also includes a time period associated with multiple entries, each time period indicating times during which an entry is active and outside of which the entry is not active, and also includes information about file types that are allowed to be played,
and said processor operates to receive and play information from the first sender if the first sender is one of the entries on the white list, and a current time is within the time period associated with the entry of the first sender on the white list, and content from the first sender matches to said information about file types on said white list,
and said processor operates to not play information from the first sender if the first sender is not on the white list,
and said processor operates to not play information from the first sender if a current time is not within the time period indicated on the white list during which the first sender is active,
and said processor operates to not play information from the first sender if content from the first sender does not match to said information about file types on said white list.

22. A stream receiver device that receives information indicative of streams to be played from remote devices, said stream receiver device comprising:
a network connection, receiving information indicative of streams to be played from remote devices; and
a processor, that operates to receive the information and operates to play a stream based on said information,
said stream receiver including an access list of remote devices, said access list being a black list, that includes multiple entries, including devices that are allowed to pay, and also includes a time period associated with multiple entries, each time period indicating times during which an entry is active and outside of which the entry is not active, and also includes information about file types that are prevented from being played,
and said processor operates to receive and play information from the first sender if the first sender is not on the black list, and a current time is within at least one time period indicated on the black list during which the first sender is active, and if content from the first sender matches to said information about file types on said black list,
and said processor operates to not play information from the first sender if the first sender is not on the black list,
and said processor operates to not play information from the first sender if a current time is within at least one time period indicated on the black list during which the first sender is active,
and said processor operates to not play information from the first sender if content from the first sender matches to said information about file types on said black list.

* * * * *